United States Patent [19]

Shyu et al.

[11] Patent Number: 4,767,822
[45] Date of Patent: Aug. 30, 1988

[54] METHOD OF FORMING A NONAQUEOUS STABLE EMULSION OF RUBBER IN POLYMERIZABLE MONOMER, AND THE POLYMERIZATION PROCESS AND THERMOPLASTIC COPOLYMERS PRODUCED THEREBY

[75] Inventors: Wen B. Shyu, Chagrin Falls, Ohio; David A. Woodhead, Llantwit Major, Wales; Vincent P. Quigley, Maple Heights, Ohio

[73] Assignee: The Standard Oil Company, Cleveland, Ohio

[21] Appl. No.: 90,817

[22] Filed: Aug. 28, 1987

Related U.S. Application Data

[62] Division of Ser. No. 741,913, Jun. 6, 1985, Pat. No. 4,698,389, which is a division of Ser. No. 705,266, Feb. 25, 1985, Pat. No. 4,552,921.

[51] Int. Cl.$^4$ .................. C08L 51/04; C08L 53/00
[52] U.S. Cl. .................................. 525/99; 525/193
[58] Field of Search ............................ 525/99

[56] References Cited

U.S. PATENT DOCUMENTS 4,524,180  6/1985  Sun ........................................ 525/99

Primary Examiner—Jacob Ziegler
Attorney, Agent, or Firm—D. P. Yusko; D. J. Untener; L. W. Evans

[57] ABSTRACT

A process for the production of a nonaqueous stable emulsion feedstock comprising a rubber, a block copolymer having at least one component miscible with the rubber and at least one component miscible with the monomer, and at least two unsaturated organic monomers capable of free radical polymerization is disclosed. At least one of the monomers must be miscible with the rubber and the mixture of the monomers is substantially a nonsolvent for the rubber. The block copolymer maintains the rubber or rubber-rich particles in emulsified form within the mixture of monomers. In general, the process comprises (1) mixing the rubber, block copolymer and at least a portion of the rubber miscible monomers to form a first nonaqueous solution, (2) mixing the remaining monomers and the remaining portion of the rubber miscible monomers to form a second solution, and (3) combining the two solutions to form the nonaqueous stable emulsion feedstock. A process for polymerizing this feedstock material and the polymerization product produced thereby is also disclosed.

11 Claims, No Drawings

METHOD OF FORMING A NONAQUEOUS STABLE EMULSION OF RUBBER IN POLYMERIZABLE MONOMER, AND THE POLYMERIZATION PROCESS AND THERMOPLASTIC COPOLYMERS PRODUCED THEREBY

This is a division of application Ser. No. 741,913 filed June 6, 1985, now U.S. Pat. No. 4,698,389, which is a divisional of Ser. No. 705,266 filed Feb. 25, 1985, now U.S. Pat. No. 4,552,921 issued Nov. 12, 1985.

BACKGROUND OF THE INVENTION

The present invention is directed to a novel process for fabricating a nonaqueous emulsion feedstock for use in the preparation of rubber-modified thermoplastic copolymers (two or more monomer components), a process for the preparation of rubber-modified thermoplastic copolymers and the new and improved rubber-modified copolymers produced by this method. In particular, the polymerization process of the present invention is characterized by the use of a single nonaqueous stable rubber-containing emulsion feedstock comprising (1) a mixture of free radical polymerizable unsaturated organic monomers which mixture is substantially a nonsolvent for the rubber, (2) a rubber and (3) a block copolymer. The rubber-modified thermoplastic material of the present invention comprise the polymerization product of the nonaqueous emulsion feedstock. In particular the rubber-modified copolymers of the present invention may comprise the polymerization product of a monoalkenyl aromatic monomer, a $C_1$ to $C_3$ alkyl methacrylate and/or acrylonitrile, an unsaturated dicarboxylic anhydride, rubber and a block copolymer. A rubber-modified thermoplastic copolymer of the present invention comprising a monoalkenyl aromatic monomer, a $C_1$ to $C_3$ alkyl methacrylate, unsaturated dicarboxylic anhydride, rubber, and block copolymer is characterized, by improved heat distortion temperature, transparency and impact strength.

Generally, rubber-modified copolymer compositions have been prepared by various procedures such as bulk inversion polymerization, aqueous emulsion polymerization, or solution polymerization. In particular, rubber-modified terpolymers such as styrene/maleic anhydride/alkyl methacrylate have been made by solution polymerization as evidenced by U.S. Pat. No. 4,341,695.

Each of the above-mentioned polymerization procedures has severe limitations. For example, aqueous emulsion polymerization or solution polymerization although enabling suitable rubber dispersion have the obvious disadvantage that the water or solvent which is present during the processing must be removed resulting in a severe economic disadvantage.

Bulk inversion polymerization usually results in a matte finish polymer due to the large (>1 micron) nonuniform particle size of the rubber formed. Furthermore, the process cannot be employed in conventional reactors where the monomer mixture is a nonsolvent for the rubbery component. Bulk polymerization which employs an extruder as the polymerization vessel overcomes some of these feedstock miscibility problems as well as alleviating some of the problems associated with aqueous emulsion or solution polymerization. In particular, reactor extruders of the twin screw design (see U.S. Pat. No. 4,463,137) provide sufficient shearing action during polymerization of the monomers that the resulting rubber-modified copolymer has smaller size rubber particles dispersed therein. However, there are some problems associated with reactor extruder polymerization. For example, the two feed solution described in U.S. Pat. No. 4,463,137 has potential pumping problems associated with the extremely high viscosity differential between the two feeds making it difficult to control the feed ratios. In addition, the dispersion of the intractable rubber rich phase in a desirable manner in the polymerized product is particularly difficult to achieve due to the rapid rates advantageously used in the reactor-extruder polymerization process. That is, there is not enough time for uniform dispersion of the rubber particles resulting in poor rubber phase dispersion in the finished products.

The present invention is directed to a procedure which alleviates the problems associated with the above-identified procedures and the novel polymerization product produced by this procedure. The present invention provides a means for preparing a single feed mixture having a desired low viscosity and predetermined rubber particle size. This single feed mixture results in an evenly dispersed rubber phase within the bulk polymerization product. The resulting rubber-modified polymerization product of the present invention possesses unexpectedly superior physical characteristics compared to the rubber-modified polymerization products known in the art.

SUMMARY OF THE INVENTION

It is an object of the present invention to provide a process for the preparation of a nonaqueous, stable emulsion comprising rubber or rubber-rich particles dispersed in a mixture of monomers.

It is another object of the present invention to provide a new and improved process for the production of rubber-modified thermoplastic copolymer.

It is a further object of the present invention to provide a process for the production of a rubber-modified thermoplastic copolymer from a single nonaqueous emulsion feedstock.

It is still another object of the present invention to provide a process for fabricating a rubber containing nonaqueous emulsion feedstock having improved stability to coagulation.

It is a still further object of the present invention to provide a process for the production of a rubber-modified copolymer from a single nonaqueous feedstock substantially free of inert organic solvent.

It is still another object of the present invention to provide a novel transparent rubber-modified thermoplastic copolymer.

It is a further object of the present invention to provide a novel rubber-modified thermoplastic copolymer having improved heat distortion temperatures and impact strength.

Additional objects, advantages and novel features of the invention will be set forth in part in the description that follows, and in part will become apparent to those skilled in the art upon examination of the following or may be learned by practice of the invention. The objects and advantages of the invention may be realized and obtained by means of the instrumentalities and combinations particularly pointed out in the appended claims.

To achieve the foregoing and other objects and in accordance with the purpose of the present invention as embodied and broadly described herein, the method of fabricating the rubber-containing nonaqueous stable emulsion feedstock of the present invention comprises combining (1) at least two miscible organic monomers at least one of which is a solvent for the rubber, (2) a block copolymer having at least one component miscible with at least one of the monomers and at least one component miscible with the rubber and (3) a rubber. The mixture of monomers is substantially a nonsolvent for the rubber; and the rubber is held in emulsified form within the monomer mixture by the block copolymer. The procedure for combining the monomers, rubber, and block copolymer comprises (1) mixing at least a portion of one of the rubber miscible (soluble) monomers, the rubber and the block copolymer to form a first nonaqueous solution, (2) mixing the remaining portion of the rubber miscible monomers, and the remaining monomers to form a nonaqueous second solution and (3) combining the first and second solutions to form a nonaqueous, stable emulsion comprising rubber or rubber-rich particles dispersed in the mixture of monomers.

Optionally, a portion of the remaining monomers (i.e. rubber-insoluble monomers) may be included in the first solution. However, it cannot be present in an amount which will cause the rubber to precipitate in the first solution.

In a preferred embodiment of the present invention, the size of the rubber or rubber-rich particles is between 0.1 to 10 microns.

In another preferred embodiment of the process of forming the nonaqueous feedstock of the present invention, the process includes forming the nonaqueous feedstock substantially free of any inert organic solvent (e.g. less than 5 weight %). The term inert organic solvent is defined for purposes of this application as an organic solvent material incapable of any type polymerization such as methyl ethyl ketone. Most preferably, the nonaqueous emulsion is completely free of inert organic solvent.

In still another preferred embodiment of the present invention the monomers are selected to include unsaturated organic monomers capable of free radical polymerization.

In a further preferred embodiment of the process of forming the nonaqueous feedstock of the present invention the suitable classes of free radical polymerization unsaturated organic monomers include acrylates, acrylonitrile or its substituted homologs, acrylic acid or acrylic ester and its substituted homologs, acrylic acid or acrylic ester and its substituted homologs, acylamides, unsaturated dicarboxylic anhydrides, vinyl esters and monoalkenyl aromatic monomers.

In a still further preferred embodiment of the process of forming the nonaqueos feedstock of the present inventionthe free radical polymerizable monomers are selected to include $C_1$ to $C_3$ alkyl esters of methylacrylic acid, acrylonitrile or methacrylonitrile, unsaturated dicarboxylic anhyrides and monoalkenyl aromatic monomers.

The monoalkenyl aromatic monomer is preferably styrene but styrene derivatives such as alpha-methylstyrene, chlorostyrene, 2,4-dichlorostyrene, p-methylstyrene and 2-chloro-4-methylstyrene may be substituted for styrene in whole or part if desired. Most preferably, the monoalkenyl aromatic monomer is present in the range of 5 to 60 parts by weight.

The unsaturated dicarboxylic acid anhydride is most preferably maleic anhydride though any of the homologs of maleic anhydride such as itaconic, citraconic, aconitic anhydrides can also be used.

The $C_1$ to $C_3$ alkyl ester of methylacrylic acid can be methyl methacrylate, ethyl methacrylate or propyl methacrylate. The preferred copolymerizable monomer is methyl methacrylate.

The rubber component of the polymeric composition can be selected from a wide range of alternatives including butadiene polymers and copolymers, styrene-butadiene rubber, ethylene/propylene rubber (EPR), ethylene/propylene/diene rubber (EPDM) and nitrile rubbers.

Preferably the block copolymers may comprise styrene/ethylene-butylene block copolymer when the rubber is EPDM or EPR or styrene/butadiene block copolymer when the rubber is polybutadiene. Most preferably, the styrene content of the block copolymer is at least about 25 weight percent.

A further preferred embodiment of fabricating the stable nonaqueous emulsion of the present invention comprises (1) mixing a monoalkenyl aromatic monomer, a rubber and a block copolymer having at least one component miscible with the monomers and at least one component miscible with the rubber and at least a portion of the $C_1$ to $C_3$ alkyl methacrylate in a first container to form a nonaqueous first solution, (2) mixing the remaining portion of the $C_1$ to $C_3$ alkyl methacrylate and an unsaturated dicarboxylic anhydride in a second container to form a nonaqueous second solution, and (3) combining the first and second solutions to form the nonaqueous stable emulsion feedstock of the present invention.

In a further preferred embodiment of the present invention the amount of monoalkenyl aromatic monomer present in the solution is in the range of about 5 to 60 parts by weight. Most preferably, the monoalkenyl aromatic is styrene present in the range of 15 to 50 parts by weight.

In a still further preferred embodiment of the present invention, acrylonitrile may be substituted in part for the $C_1$ to $C_3$ alkyl methacrylate in the nonrubber containing solution.

In another preferred embodiment of the present invention, the unsaturated dicarboxylic anhydride is present in the range of about 5 to 30 parts by weight and the $C_1$ to $C_3$ alkyl methacrylate and acrylonitrile are present in about 25 to 80 parts by weight. Most preferably, the unsaturated dicarboxylic anhydride is present in the range of 10 to 25 parts by weight and the alkyl methacrylate and acrylonitrile are present in the range of 30 to 70 parts by weight.

In still another preferred embodiment of the present invention the rubber and block copolymer are present in about 5 to 30 parts by weight, most preferably 10 to 20 parts by weight.

In another aspect of the present invention the process of producing a rubber-modified thermoplastic copolymer comprises placing the nonaqueous stable emulsion feedstock of the present invention in a polymerization apparatus, heating the emulsion, optionally, in the presence of an initiator, to polymerize the feedstock producing a rubber-modified thermoplastic polymer having an extremely uniform dispersion of rubber particles throughout the polymeric matrix.

In a preferred embodiment of this aspect of the present invention, the initiator is selected to include an organic peroxide initiator such as benzoyl peroxide or dicumyl peroxide.

In a further preferred embodiment of this aspect of the present invention, the nonaqueous stable emulsion is fed to a reactor extruder and heated to an elevated temperature for a time sufficient to polymerize the emulsion. Typically, the emulsion is heated to a temperature in the range of about 120°-200° C. for about 2-20 minutes, optionally, in the presence of an initiator, and polymerized to produce a rubber-modified thermoplastic polymer.

It is still another aspect of the present invention to provide a novel rubber-modified transparent thermoplastic terpolymer comprising styrene (Sty), methylmethacrylate (MMA), maleic anhydride (MAH), rubber and a block copolymer having one component miscible with the monomers and a second component miscible with the rubber.

In a preferred embodiment of this aspect of the present invention styrene is present in the range of about 5 to 30 parts by weight, maleic anhydride is present in the range of about 5 to 30 parts by weight, rubber and block copolymer are present in the range of about 5 to 25 parts by weight, most preferably 10 to 20 parts by weight, and the methylmethacrylate is present in the range of about 50 to about 80 parts by weight.

In a further preferred embodiment of this aspect of the present invention the maleic anhydride (MAH) level was no greater then 30 parts by weight. Most preferably the MAH was present in the range of 15-30 parts by weight.

It is still another aspect of the present invention to provide a novel rubber-modified thermoplastic copolymer comprising styrene, maleic anhydride, acrylonitrile, rubber and a block copolymer having at least one component miscible with the monomers and at least one component miscible with the rubber.

In a preferred embodiment of this aspect of the present invention the acrylonitrile is present in the range of 10 to 50 parts by weight (pbw). Most preferably, the acrylonitrile is present in the range of about 15-25 pbw.

In another preferred embodiment of the present invention the styrene is present in the range of 40 to 60 pbw, most preferably, 45 to 55 pbw.

In still another preferred embodiment of the present invention the maleic anhydride is present in the range of about 5 to 30 pbw. Most preferably, maleic anhydride is present in the range of about 15 to 25 pbw.

The process of the present invention and the product produced provide several distinct advantages over the prior procedures and products. For example, the process of the present invention provides a procedure for fabricating a nonaqueous feedstock substantially free of any inert organic solvent. In addition, the feedstock emulsion is quite stable to coagulation and possesses a long shelf life thereby substantially eliminating any concerns regarding coagulation during temporary production shutdown. Moreover, compared with conventional 15-25% solids rubber solutions, the emulsion feedstock of the present invention possesses a relatively low viscosity and, furthermore, a uniform dispersion of rubber or rubber-rich particles in the monomer solution. The fact that this good dispersion in the feed solution remains essentially unchanged on subsequent polymerization makes the single feed system particularly suitable for fast kinetic polymerization systems. In addition, the single feed emulsion of the present invention provides (1) a means of increasing the rubber content without causing high viscosity problems and (2) a means to change the monomeric composition of the emulsion after formation without disturbing the stability of the emulsion.

Finally, due to the better rubber dispersion control, the products produced by the present invention have better gloss while maintaining other properties such as good impact strength and high heat distortion temperature. In particular, the rubber modified thermoplastic copolymers of the present invention have exhibited improved heat distortion temperature over similar rubber modified styrene, methylmethacrylate copolymers and significantly improved impact strength over rubber-modified styrene (Sty), methylmethacrylate (MMA), maleic anhydride (MAH) terpolymers. For example, the rubber modified STY/MMA/MAH copolymers of the present invention possess a unique combination of properties and are produced at a moderate cost. The rubber modified STY/MMA/MAH copolymers of the present invention, typically, possess a high degree of transparency ($>80\%$), toughness (N.I.$>3$ ft.-lb/in) and heat distortion temperature ($>95°$ C.).

DETAILED DESCRIPTION OF THE INVENTION

Reference will now be made in detail to the present preferred embodiments of the invention.

The rubber-modified copolymers of the present invention can be polymerized in any known reactor (e.g. autoclaves). However, a preferred means of polymerizing the copolymers of the present invention is a twin screw extruder reactor. The operation of the twin screw extruder is set forth in detail in U.S. Pat. No. 4,463,137 herein incorporated by reference.

The rubber-modified copolymer of the present is prepared by polymerizing the single nonaqueous emulsion feedstock of the present invention. Most preferably, the nonaqueous feedstock is substantially free of any inert organic solvent. The feedstock comprises a nonaqueous emulsion comprising rubber, a block copolymer having at least one component miscible with the rubber and at least one component miscible with the monomer and at least two miscible organic monomers, at least one of the monomers being a solvent for the rubber, and the mixture of the monomers being substantially a nonsolvent for the rubber. The rubber is maintained (held) in emulsified form within the monomer mixture by the block copolymer. Preferably, the organic monomers are unsaturated and capable of free radical polymerization.

Most preferably, the feedstock comprises a nonaqueous emulsion of a rubber, a monoalkenyl aromatic monomer, an unsaturated dicarboxylic anhydride, a $C_1$ to $C_3$ alkyl methacrylate and/or acrylonitrile and a block copolymer having at least one component miscible with the monomer and at least one component miscible with the rubber. The function of the block copolymer is to stabilize the nonaqueous emulsion feedstock in a similar manner to that of a surfactant used in making aqueous emulsions. The block copolymer prevents or substantially delays the rubber phase from precipitating out during mixing of the monomers and rubber component of the nonaqueous emulsion feedstock. This results in the formation of a stable emulsion suitable for direct polymerization without the aid of any conventional solvent (e.g. methyl ethyl ketone).

In particular, the method of fabricating the feedstock of the present invention comprises (1) mixing at least a portion of the $C_1$ to $C_3$ methacrylate, the monoalkenyl aromatic monomer, rubber and block copolymer in a first container to form a first nonaqueous solution, (2) mixing the remaining portion of a $C_1$ to $C_3$ alkyl methacrylate and the unsaturated dicarboxylic anhydride in a second container to form a second nonaqueous solution, and combining the two solutions with stirring to produce the nonaqueous stable emulsion feedstock comprising rubber or rubber-rich particles in the monomer mixture. In addition, further monomer can be added at this point without disturbing the stability of the feedstock but to enable one to change the characteristics of the resultant polymer. Such flexibility is highly desirable as described in Examples VII and VIII below. Finally, the size of the rubber or rubber-rich particles present in the emulsion ranges from about 0.1 to 10 microns. This feedstock can be polymerized in a reactor extruder apparatus as described in U.S. Pat. No. 4,463,137.

Preferably, the concentration of the components comprising the nonaqueous emulsion feedstock of the present invention are about 5 to 60 (most preferably 15 to 50) pbw monoalkenyl aromatic monomer (e.g. styrene), about 25 to 80 pbw (most preferably 30–70) $C_1$ to $C_3$ alkyl methacrylate (e.g. methyl methacrylate), about 5 to 30 pbw (most preferably 10–25) dicarboxylic unsaturated anhydride (e.g. maleic anhydride) and 5 to 30 pbw (most preferably 10–20) block copolymer (e.g. styrene/butadiene) and rubber.

In a preferred embodiment of the present invention acrylonitrile is substituted in part for the $C_1$ to $C_3$ alkyl methacrylate in the nonrubber containing solution.

The process of fabricating the rubber-modified thermoplastic copolymers of the present invention comprises preparing a stable nonaqueous feedstock according to the procedure of the present invention, placing the feedstock in a polymerization apparatus and heating the feedstock, optionally, in the presence of an initiator, to polymerize the monomers to form a rubber-modified thermoplastic copolymer possessing superior rubber particle dispersion, increased heat distortion temperatures, and improved impact strength.

Typically, the nonaqueous emulsion feedstock is fed into a reactor extruder and polymerized in the presence of an initiator (i.e. about 0.03 to 0.3 weight %) such as benzoyl peroxide at an elevated temperature (e.g. 120° to 200° C.) for time sufficient to effect polymerization (e.g. 2 to 20 minutes). It should be understood that benzoyl peroxide is merely illustrative of the types of initiators which may be utilized in the practice of the present invention. Any other suitable organic peroxide initiator such as dicumyl peroxide may be utilized.

The preparation of two preliminary solutions seems to be an essential step in the process of this invention, in order to obtain the desired emulsion of rubber or rubber-rich particles in the monomer mixture. For example, the rubber and block copolymer must be present in the same preliminary solution or the rubber will not emulsify and will remain as a coagulated mass just as if the block copolymer were not present. Moreover, other optimum process details such as the order of addition of the two preliminary solutions to each other (usually the rubber free solution should be added to the rubber solution) and the relative ratios of the common third monomer in the preliminary solutions will vary as the components vary, but will be readily determined by one skilled in the art.

The following examples set forth below are illustrative of the preferred embodiments of the present invention.

EXAMPLE I 14.7 part Maleic Anhydride was dissolved into 19.7 parts methyl methacrylate (MMA) to form nonaqueous solution I. Next 15.6 parts styrene was blended into 50.0 parts MMA and then 10.9 parts polybutadiene rubber (high cis 1,4 polybutadiene; Typical Mooney $ML_{1+4}$ at 100° C.=25–35) and 10.9 parts styrene-butadiene block copolymer (linear diblock copolymer with Styrene/butadiene ratio 25/75 Molecular weight 83,000) were added to form nonaqueous solution II. Once both solutions I and II were fully dissolved, solution I was slowly added to solution II over approximately 4 hours during which time both solutions were continuously agitated. The resulting nonaqueous emulsion feedstock has a dispersion of small rubber particles in a reactive monomer solution.

This feedstock was bulk polymerized in a reactor-extruder at a temperature of about 120°–180° C. using 0.11% benzoyl peroxide as an initiator and 9 minute reaction time. The resulting polymer product had a 75% light transmission, a HDT of 83° C., and an impact strength of 3.3 ft-lb/in notch.

EXAMPLE II

A feed was prepared in the manner described in Example I but with a final composition of 70 parts methyl methacrylate, 15 parts MAH, 15 parts styrene and 7.7 parts each of the block copolymer and rubber used in Example I. This feed was polymerized as in Example I. Dicumyl peroxide, (0.13%) was used as initiator. A reaction time of 5–6 minutes was used. The polymer product properties were:

| Reaction time | 6 min. | 5 min. |
|---|---|---|
| Notched Izod (ft-lb/in notch) | 3.1 | 2.7 |
| HDT (°C.) | 87.0 | 96.0 |
| Light Transmission (%) | 73.0 | 74.0 |

EXAMPLE III

A feed was prepared as in Example II, but polymerized using benzoyl peroxide (0.15%) as initiator, with an 11 minute reaction time. The product properties were as follows:

| Notched Izod (ft-lb/in notch) | 4.0 |
|---|---|
| HDT (°C.) | 81.0 |
| Light Transmission (%) | 70.0 |

EXAMPLE IV

A feed was prepared by the procedure of Example II. The feed was modified through the addition of 11 parts of a 1:1 (mole ratio) solution of styrene and maleic anhydride to produce a feed of the following composition (with reduced rubber content):

62 parts MMA, 19 parts of styrene, 19 parts of MAH, 6.9 parts block copolymer and 6.9 rubber (polybutadiene). This feed was polymerized at 120°–180° C., using dicumyl peroxide initiator (0.12%), with a 7 minute reaction time. The polymer product had properties shown below.

| Notched Izod (ft-lb/in notch) | 1.6 |
|---|---|
| HDT (°C.) | 98.0 |

| | Light Transmission (%) | 80.0 |
|---|---|---|

EXAMPLE V

Solution I was composed of 24.4 parts maleic anhydride (MAH) and 29.5 parts Acrylonitrile (AN). Solution II was made of 5.4 parts rubber (cis 1,4-polybutadiene), 5.4 parts styrene/butadiene diblock copolymer, (styrene 25%, butadiene 75%.), and 46.1 parts styrene. By stirring and mixing together the Solutions I and II, a stable emulsion solution was formed. Upon examination of the solution under a phase contrast microscope, the rubber particle size is <1 micron. The solution was polymerized in a test tube in the presence of 0.2% benzoyl peroxide at 90°-100° C. for 20 minutes to give a uniform looking product.

EXAMPLE VI

Four batches of emulsified feed solutions were prepared in 5 gallon reactors. Each of these solutions involved blending an AN/MAH solution (I) to a styrene/rubber/block copolymer solution (II) in ten increments over 5 hours. The rubber and block copolymer in Solution II was a blend of 2 parts of a diblock copolymer containing 25% styrene and 75% butadiene to 1 part rubber (polybutadiene). The following table shows the compositions of the A and B solutions:

| Solution # | Solution I (parts in feed) | Solution II (parts in feed) |
|---|---|---|
| 10496-79-S1 | 20.5 AN/27.0 MAH | 52.5 S/25.8 rubber & block copolymer |
| 10496-79-S2 | 20.6 AN/27.2 MAH | 52.5 S/15.6 rubber & block copolymer |
| 10496-79-S3 | 36.9 AN/16.5 MAH | 46.5 S/22.9 rubber & block copolymer |
| 10496-79-S4 | 27.1 AN/20.3 MAH | 52.6 S/25.9 rubber & block copolymer |

The emulsion feedstock was then polymerized by continuously pumping these solutions, together with a 5% benzoyl peroxide solution in a desired ratio, into a 28 mm twin screw reactor-extruder at temperatures of 120°-190° C. (from Zone 1 to die), and with residence time of about 5 minutes. The monomer conversions were 35-70%. The crude polymer products were mechanically ground at room temperature and dried in an oven at 100° C. for 2 hours. the dried products were compression molded into test bars for physical property measurements. The following table shows some selected physical properties:

| Solution # | Notched Izod (ft-lb/in) | HDT (°C.) | Break Strength (psi) | % Elong. at break | Tensile Modulus (psi) |
|---|---|---|---|---|---|
| 10496-79-S1 | 3.1 | 131 | 4800 | 6.9 | 2.3 × 10$^5$ |
| 10496-79-S2 | 2.0 | 133 | 6500 | 2.8 | 3.4 × 10$^5$ |
| 10496-79-S | 3.3 | 105 | 4500 | 14.0 | 2.0 × 10$^5$ |
| 10496-79-S4 | 3.4 | 122 | 4000 | 13.0 | 1.7 × 10$^5$ |

EXAMPLE VII

In this example acrylonitrile was substituted in part for the MMA.

Methylmethacrylate (MMA) was added to a nonaqueous emulsion of styrene (STY)/acrylonitrile (AN)-/maleic anhydride (MAH)/polybutadiene rubber/styrene-butadiene (S-B) block copolymer made by the procedure of Example VI (solution #1496-79-S4) to form a nonaqueous stable emulsion that was then polymerized in a reactor-extruder using 0.13% benzoyl peroxide and a 6 minute reaction time. The net feed composition was 26.7 parts MMA, 38.5 parts STY, 19.9 parts AN, 14.9 parts MAH, 6.3 parts polybutadiene rubber, and 12.6 parts S-B block copolymer.

The rubber-modified product of this example had an improved transparency over opaque polymers which did not contain MMA. Transparency for this polymer was 31%.

EXAMPLE VIII

The same procedure was followed as described in Example VII above. However, the net feed composition was 57.4 parts MMA, 22.4 parts STY, 11.5 parts AN, 8.7 parts MAH, 3.7 parts polybutadiene rubber, and 7.3 parts S-B block copolymer.

Transparency was approximately 36%.

EXAMPLE IX

The solutions were prepared and polymerized according to Example VI.

| Solution I | AN = 42.7 parts |
| | MAH = 9.2 parts |
| Solution II | Styrene = 48.1 parts |
| | EP Rubber |
| | (ethylene 40% - propylene 60%) |
| | Styrene/ethylene - propylene/ |
| | styrene triblock copolymer |
| | (29% styrene) |

The physical properties of the resulting rubber modified thermoplastic polymer were:

| Notched Izod $\frac{(ft\text{-}lbs)}{(in)}$ | 0.6; 0.8 |
|---|---|
| HDT (unannealed) (°C.) | 91; 92 |
| Break Strength (PSI) | 5300; 5500 |
| % Elong. at Break | 1.6; 1.8 |
| Tensile Modulus (PSI) | 3.5 × 10$^5$; 3.8 × 10$^5$ |

EXAMPLE X

In this example, methyl methacrylate (MMA) was substituted for acrylonitrile (AN) to produce a rubber-modified S/MMA/MAH terpolymer. The rubber and block copolymer in this case was a blend of 1 part diblock copolymer (25% styrene-75% butadiene) to 1 part rubber (polybutadiene). The solutions used in this case are the following:

| Solution # | Solution I (parts in feed) | Solution II (parts in feed) |
|---|---|---|
| 10496-98-2 | 19.7 MMA/14.7 MAH | 15.6 S/50.0 MMA/22.0 Rubber and Block Copolymer |
| 10496-98-3 | 12.9 MMA/19.3 MAH | 51.1 S/16.7 MMA/22.1 Rubber and Block Copolymer |

These solutions were polymerized and processed in a similar manner to example VIII. Results of physical testing were as follows:

| Solution # | Notched Izod (ft-lb/in) | HDT (°C.) | Break Strength (psi) | % Elong. at break | Tensile Modulus (psi) |
|---|---|---|---|---|---|
| 10496-98-2 | 3.3 | 83 | 3800 | 58.0 | $1.4 \times 10^5$ |
| 10496-98-3 | 3.0 | 119 | 3300 | 9.9 | $1.8 \times 10^5$ |

As evidenced by the above examples, the rubber-modified terpolymers of the present invention comprising styrene, methyl methacrylate and maleic anhydride exhibit a high transparency >(80%), toughness (e.g. N.I.>3 ft. lb/in.) and heat resistance (HDT>95° C.). Rubber-modified copolymers of the present invention comprising styrene, maleic anhydride and acrylonitrile substitute in part or wholly for methyl methacrylate possesses high impact strength, high heat distortion temperature and excellent uniformity. The resulting rubber-modified copolymers of the present invention have a broad range of uses as evidence by U.S. Pat. Nos. 4,341,695 and 4,463,137. In particular, the rubber modified copolymers of the present invention may be used as appliance housing and the like.

The foregoing description of the preferred embodiments of the present invention has been presented for purposes of illustration and description. It is not intended to be exhaustive or to limit the invention to the precise form disclosed, and obviously many modification and variations are possible in light of the above disclosure. The embodiments were chosen and described in order to explain best the principle of the invention and its practical applications to thereby enable others skilled in the art to best utilize the invention in its various embodiments and with various modifications as are suited to the particular were contemplated. It is intended that the invention be defined by the claims appended hereto.

What is claimed is:

1. A rubber-modified thermoplastic copolymer composition comprising a monoalkenyl aromatic monomer, an unsaturated dicarboxylic acid anhydride monomer, an acrylonitrile monomer, a rubber, and a block copolymer having at least one component miscible with said rubber, wherein said rubber modified copolymer is prepared by polymerizing a single nonaqueous emulsion feedstock comprising each said monomer, said rubber and said block copolymer.

2. The rubber-modified thermoplastic copolymer composition of claim 1 wherein methacrylonitrile is substituted for acrylonitrile.

3. The rubber modified thermoplastic copolymer composition of claim 1 wherein said block copolymer is styrene/butadiene or styrene/ethylene-butylene block copolymers.

4. The rubber-modified thermoplastic copolymer composition of claim 1 wherein said nitrile is present in the range of 10 to 50 parts by weight, said monoalkenyl aromatic monomer is present in the range of 40 to 60 parts by weight, said unsaturated dicarboxylic anhydride is present in the rage of 5 to 30 parts by weight and said block copolymer and rubber are present in the range of about 5 to 30 parts by weight.

5. The thermoplastic copolymer composition of claim 3 wherein said rubber and block copolymer are present in the range of about 5 to 30 parts by weight.

6. The thermoplastic copolymer composition of claim 1 wherein said monoalkenyl aromatic monomer is selected from the group consisting of styrene and its derivatives.

7. The thermoplastic copolymer composition of claim 6 wherein monoalkenyl aromatic monomer is styrene and said styrene is present in the range of about 5 to 30 parts by weight.

8. The thermoplastic composition of claim 1 wherein said unsaturated dicarboxylic acid anhydride is selected from the group consisting of maleic anhydride, itaconic anhydride, citraconic anhydride and aconitic anhydride.

9. The thermoplastic composition of claim 8 wherein said anhydride is present in the range of about 5 to 30 parts per weight.

10. The rubber-modified thermoplastic polymer composition of claim 1 wherein said rubber is selected from the group consisting of polybutadiene, ethylene/propylene and ethylene/propylene/diene.

11. The rubber-modified thermoplastic polymer composition of claim 1 wherein said block copolymer is a styrene/butadiene copolymer wherein at least about 25 weight percent of said block copolymer comprises styrene.

* * * * *